United States Patent
Yang et al.

(10) Patent No.: US 10,503,375 B2
(45) Date of Patent: Dec. 10, 2019

(54) DISPLAY CONTROL METHOD, TERMINAL AND STORAGE MEDIUM

(71) Applicant: TENCENT TECHNOLOGY (SHENZHEN) COMPANY LIMITED, Shenzhen, Guangdong (CN)

(72) Inventors: Kai Yang, Shenzhen (CN); Xin Yang, Shenzhen (CN); Yanhui Shen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 88 days.

(21) Appl. No.: 15/720,114

(22) Filed: Sep. 29, 2017

(65) Prior Publication Data

US 2018/0024729 A1    Jan. 25, 2018

Related U.S. Application Data

(63) Continuation of application No. PCT/CN2016/081932, filed on May 12, 2016.

(30) Foreign Application Priority Data

May 30, 2015    (CN) .......................... 2015 1 0290961

(51) Int. Cl.
*G06F 3/0484*    (2013.01)
*G06F 3/0481*    (2013.01)
(Continued)

(52) U.S. Cl.
CPC ........ *G06F 3/04845* (2013.01); *G06F 3/0481* (2013.01); *G06F 3/0486* (2013.01); *G06T 3/40* (2013.01)

(58) Field of Classification Search
CPC ..... G06F 3/048; G06F 21/30–46; G06F 17/50
See application file for complete search history.

(56) References Cited

U.S. PATENT DOCUMENTS 5,771,042 A * 6/1998 Santos-Gomez ..... G06F 3/0481
715/792
5,808,610 A * 9/1998 Benson ................. G06F 3/0481
715/788
(Continued)

FOREIGN PATENT DOCUMENTS

CN    102662572 A    9/2012
CN    103793136 A    5/2014
(Continued)

OTHER PUBLICATIONS

International Search Report with Translation for International Application No. PCT/CN2016/081932 dated Aug. 18, 2016, 9 pages.

*Primary Examiner* — Jennifer N To
*Assistant Examiner* — Liang Y Li
(74) *Attorney, Agent, or Firm* — Knobbe, Martens, Olson & Bear, LLP

(57) ABSTRACT

A display control method is provided. An example method includes monitoring a first window and a second window of an application which are separately displayed on a screen of a terminal. The first window and the second window each is provided with at least one attachment point. The method further includes determining a position of the first window on the screen when it is monitored that the second window moves on the screen. A master attachment point of the first window and a slave attachment point of the second window are determined according to the position. The second window is attached to the first window by merging the slave attachment point into the master attachment point to form a merged window. The merged window is displayed on the screen.

12 Claims, 7 Drawing Sheets

(51) Int. Cl.
G06T 3/40 (2006.01)
G06F 3/0486 (2013.01)

(56) References Cited

U.S. PATENT DOCUMENTS

| | | | | |
|---|---|---|---|---|
| 5,870,091 | A * | 2/1999 | Lazarony, Jr. | G06F 3/0481 |
| | | | | 715/804 |
| 5,977,973 | A * | 11/1999 | Sobeski | G09G 5/14 |
| | | | | 715/798 |
| 6,857,106 | B1 * | 2/2005 | Brouaux | G06F 3/0481 |
| | | | | 345/630 |
| 2005/0289478 | A1 * | 12/2005 | Landman | G06F 3/048 |
| | | | | 715/804 |
| 2014/0157165 | A1 * | 6/2014 | Hoyer | G06Q 10/10 |
| | | | | 715/769 |
| 2016/0349974 | A1 * | 12/2016 | Louch | G06F 3/04847 |

FOREIGN PATENT DOCUMENTS

| | | |
|---|---|---|
| CN | 104407865 A | 3/2015 |
| CN | 104571987 A | 4/2015 |

* cited by examiner

DISPLAY CONTROL METHOD, TERMINAL AND STORAGE MEDIUM

CROSS REFERENCE TO RELATED APPLICATION

The present application is a continuation of International Application No. PCT/CN2016/081932, titled "DISPLAY CONTROL METHOD AND APPARATUS, AND TERMINAL", filed on May 12, 2016, which claims priority to Chinese Patent Application No. 201510290961.5, entitled "DISPLAY CONTROL METHOD AND DEVICE, AND TERMINAL", filed on May 30, 2015 with the State Intellectual Property Office of the People's Republic of China. Each of the above-recited applications are incorporated herein by reference their entireties for all purposes.

TECHNICAL FIELD

The present disclosure relates to the field of internet technology, and in particular to a display control method, a terminal and a storage medium.

BACKGROUND

With the development of internet technology, terminals have become widely used, such as cell phones, PADs (e.g., tablet personal computer) and intelligent wearable device. Various applications can be installed and run in a terminal, including but not limited to instant messaging applications, Social Networking Service (SNS) applications, game applications and security applications. One application in the terminal may run more than one window at a same time. As an example, an instant messaging application can run two chat windows at a same time. As another example, a security application can run an optimization acceleration function window and a Trojan killing function window at a same time.

However, in a case that one application runs more than one window at a same time, the windows are independent of each other, may move along a terminal screen separately when being dragged by a user, and are displayed separately on the terminal screen, which makes a display control method for windows of an application single and not flexible enough.

SUMMARY

A display control method, a terminal and a storage medium are provided according to embodiments of the present disclosure.

In a first aspect, a display control method is provided according to an embodiment of the present disclosure. The display control method may include monitoring, by a processor, a first window and a second window of an application, which are separately displayed on a screen of a terminal, wherein the first window and the second window each is provided with at least one attachment point; determining, by the processor, a position of the first window on the screen, in response to monitoring that the second window moves on the screen; determining, by the processor, a master attachment point of the first window and a slave attachment point of the second window, from the at least one attachment point provided to the first window and the second window, according to the position of the first window on the screen; attaching, by the processor, the second window to the first window by merging the slave attachment point into the master attachment point, to form a merged window; and displaying, by the processor, the merged window on the screen.

In a second aspect, a terminal is provided according to an embodiment of the present disclosure, which may include a screen; a memory having program codes stored therein; and a processor, that when executes the program codes, configured to: monitor a first window and a second window of an application, which are separately displayed on the screen, wherein the first window and the second window each is provided with at least one attachment point; determine a position of the first window on the screen, when it is monitored that the second window moves on the screen; determine a master attachment point of the first window and a slave attachment point of the second window, from the at least one attachment point provided to the first window and the second window, according to the position of the first window on the screen; attach the second window to the first window by merging the slave attachment point into the master attachment point, to form a merged window; and display the merged window on the screen.

In a third aspect, a computer readable storage medium for storing computer readable program codes that executed in a terminal to: monitor a first window and a second window of an application, which are separately displayed on a screen of the terminal, wherein the first window and the second window each is provided with at least one attachment point; determine a position of the first window on the screen, when it is monitored that the second window moves on the screen; determine a master attachment point of the first window and a slave attachment point of the second window, from the at least one attachment point provided to the first window and the second window, according to the position of the first window on the screen; attach the second window to the first window by merging the slave attachment point into the master attachment point, to form a merged window; and display the merged window on the screen.

According to the embodiments of the present disclosure, a first window and a second window of an application running at the same time are separately displayed. A master attachment point and a slave attachment point are determined respectively from the first window and the second window, when the second window moves on a screen of a terminal. The first window and the second window can be attached and merged via the master attachment point and the slave attachment point, so that windows of an application running at the same time can be displayed in a separate manner or in a merging manner, thereby enriching display control manners of an application and enhancing flexibility of display control.

BRIEF DESCRIPTION OF THE DRAWINGS

To illustrate technical solutions according to embodiments of the present disclosure or in the conventional technologies more clearly, drawings to be used in the descriptions of the conventional technologies or the embodiments are described briefly hereinafter. The drawings described hereinafter are only for some embodiments of the present disclosure, and other drawings may be obtained by those skilled in the art based on those drawings and fall within the present disclosure.

DETAILED DESCRIPTION OF THE EMBODIMENTS

Figure 1:
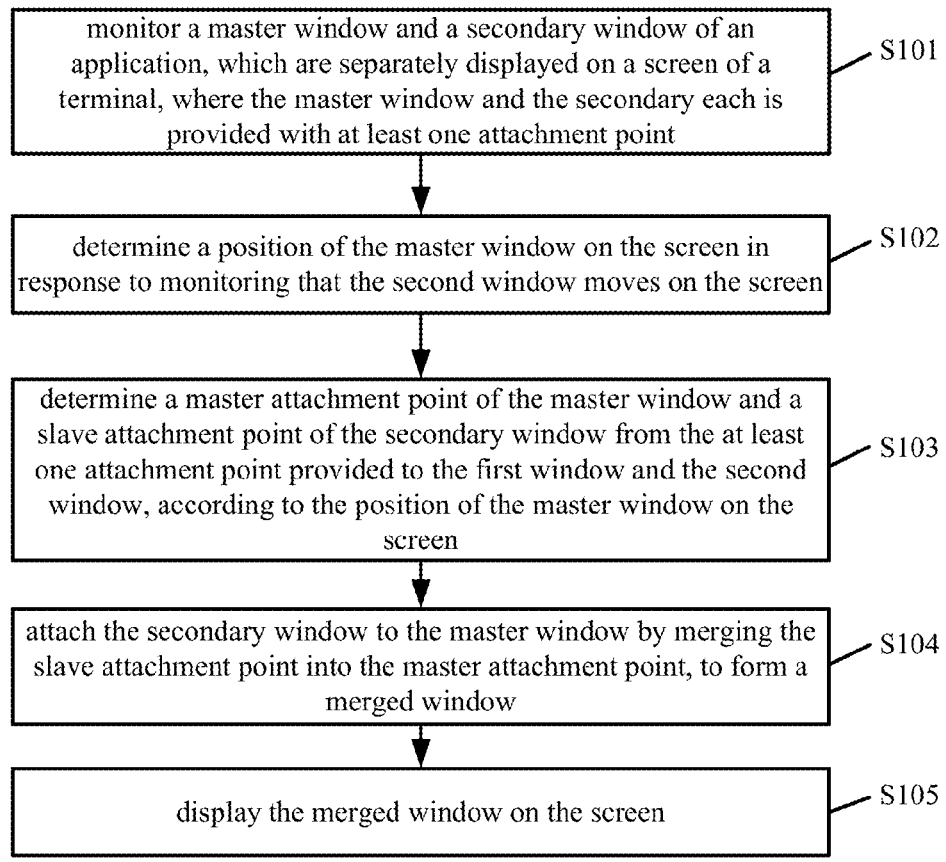
FIG. 1 is a flow chart of a display control method according to an embodiment of the present disclosure.

Technical solutions of the embodiments of the present disclosure are illustrated clearly in conjunction with the following drawings of the embodiments of the present disclosure. Apparently, the described embodiments are merely a few rather than all of the embodiments of the present disclosure. Other embodiments obtained by those skilled in the art based on the embodiments of the present disclosure shall fall within the protection scope of the present disclosure.

In the embodiments of the present disclosure, a terminal may be a device, such as a Personal Computer (PC), a laptop, a cell phone, a tablet personal computer (PAD), a headset, or intelligent wearable device. In the terminal, various applications can be installed and run, including but not limited to instant messaging applications, Social Networking Service (SNS) applications, game applications and security applications. There may be more than one windows of one application that run at the same time in the terminal. As an example, an instant messaging application can run two chat windows at a same time. As another example, a security application can run an optimization acceleration function window and a Trojan killing function window at a same time. According to the embodiments of the present disclosure, a first window and a second window, which may be referred to as a master window and a secondary window below, may be determined from more than one windows of an application that is running at the same time and are separately displayed. A master attachment point and a slave attachment point are determined respectively in the master window and the secondary window, when the secondary window moves on the screen. The master window and the secondary window can be attached and merged via the master attachment point and the slave attachment point, so that the windows of an application running at the same time can be displayed in a separate manner or in a merging manner, thereby windows of an application can be controlled and displayed in various manners and flexibility of display control is enhanced.

In the embodiments of the present disclosure, the application may be any one of applications in a terminal, the master window of the application may be any one of windows running by the application, and the secondary window of the application may be any one of windows running by the application other than the master window. The display control method according to the embodiments of the present disclosure is not triggered, e.g., the process of attaching and merging of the windows is not triggered, when the master window moves on the screen. The display control method is triggered, e.g., the process of attaching and merging of the windows is triggered, when the secondary window moves on the screen. Unless specifically noted, the display control method will be described in the following embodiments of the present disclosure by taking two windows of the application running at the same time as an example. A case that more than two windows of the application running at the same time may be implemented similarly as the following embodiments of the present disclosure.

In basis of the above description, the display control method according to the embodiments of the present disclosure illustrate is described in detail in conjunction with FIG. 1 to FIG. 7. It should be noted that, the steps of the method shown in FIG. 1 to FIG. 7 may be executed by a display control device according to the embodiments of the present disclosure. The display control device may be an application with display control capacity, for example, a security application, in a terminal.

Reference is made to FIG. 1, which is a flow chart of a display control method according to an embodiment of the present disclosure. The method may include the following steps S101 to S105.

In step S101, a master window and a secondary window of an application, which are separately displayed on a screen of a terminal, are monitored. The master window and the secondary window each is provided with at least one attachment point.

The application may be, for example, an instant messaging application, an SNS application, a game application, or a security application in a terminal. Two windows of the application may be running on the screen at the same time. For example, if the application is an instant messaging application, two chat windows of the application may be running at the same time. For another example, if the application is a security application, an optimization acceleration function window and a Trojan killing function window of the application may be running at the same time. The windows of the application may be displayed separately and independently on the screen. Among the windows of the application running on the screen, any one of the windows can be determined as a master window and any one of the windows, other than the master window, can be determined as a secondary window. The master window and the secondary window of the application, which are separately displayed on the screen, are monitored. The display control method according to the embodiments of the present disclosure is not triggered, e.g., the process of attaching and merging of the windows is not triggered, when the master window moves on the screen. The display control method is triggered, e.g., the process of attaching and merging of the windows is triggered, when the secondary window moves on the screen. Therefore, this step is mainly to monitor whether the secondary window moves on the screen. Specifically, whether there is a movement operation on the secondary window may be determined. If it is determined that there is a movement operation on the secondary window, it indicates that the secondary window may move on the screen, and the process of attaching and merging the master window and the secondary window may be triggered.

Figure 2:
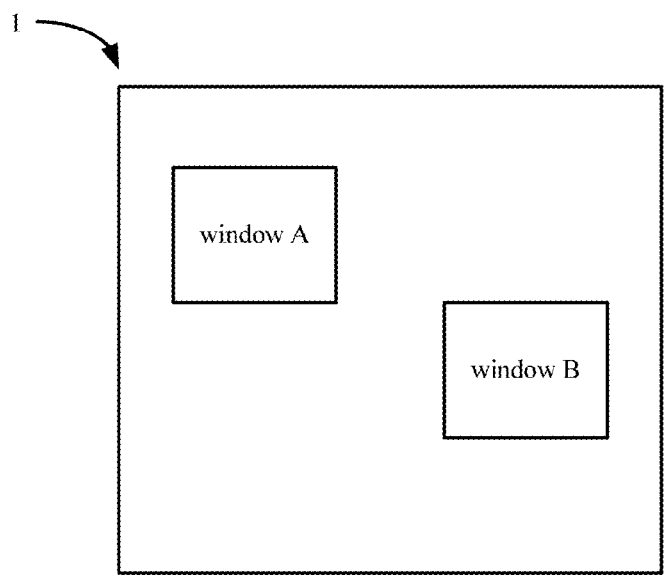
FIG. 2 is a schematic diagram of windows of an application according to an embodiment of the present disclosure.

If two windows of the application are running at the same time, one of the windows may be set as the master window, the other of the windows may be set as the secondary window, and the master window and the secondary window are independent of each other and are separately displayed on the screen. Reference is made FIG. 2, which is a schematic diagram of windows of an application according to an embodiment of the present disclosure. As shown in FIG. 2, 1 indicates a screen, and window A and window B are two windows of an application. The window A may be set as the master window and the window B may be set as the secondary window, and the window A and the window B are separately displayed on the screen 1. When being displayed on the screen, the master window A occupies a position on the screen, and the position of the master window A refers to a coordinate range formed by coordinates of all pixel points in the master window A on the screen. When being displayed on the screen, the secondary window B occupies a position on the screen, and the position of the secondary window B refers to a coordinate range formed by coordinates of all pixel points in the secondary window B on the screen. In an embodiment of the present disclosure, the terminal stores the position of each window displayed on the screen, and each window displayed on the screen may move on the screen when being dragged by a user, and thus the position is changed. When the position of each window is changed, the terminal will timely update the stored position of each window.

In an implementation, the at least one attachment point is provided to the first window or the second window in at least one direction along the screen.

Figure 3:
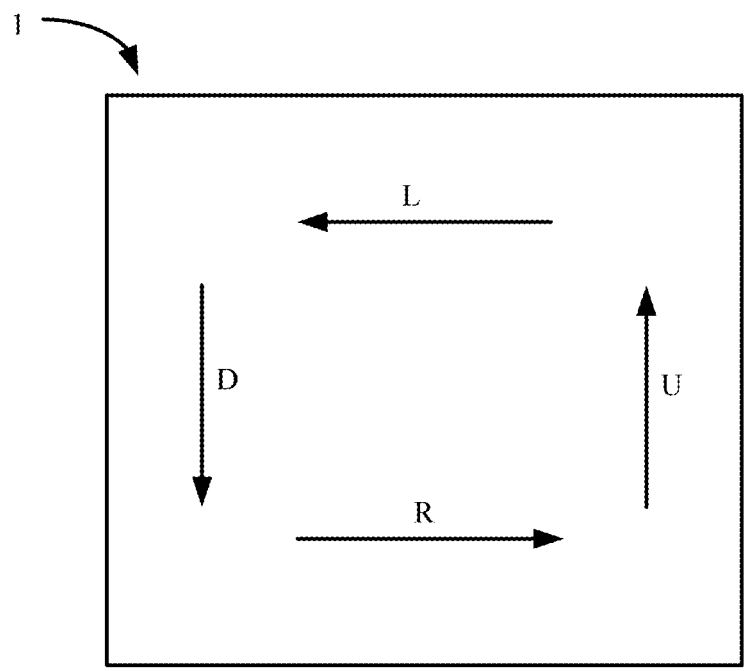
FIG. 3 is a schematic diagram showing directions of a screen of a terminal according to an embodiment of the present disclosure.

The direction along the screen may include an upward direction along the screen, a downward direction along the screen, a left direction along the screen and a right direction along the screen. Reference is made to FIG. 3, which is a schematic diagram showing directions along a screen according to an embodiment of the present disclosure. As shown in FIG. 3, an arrow L (Left) indicates a direction to the left along the screen, an arrow R (Right) indicates a direction to the right along the screen, an arrow D (Down) indicates a direction downwards along the screen, and an arrow U (Up) indicates a direction upwards along the screen.

In an implementation, the attachment point is provided to the window in an upward direction along the screen refers that the vertical distance between the attachment point and an upper edge of the screen is less than each of the vertical distance between the attachment point and a lower edge of the screen, the vertical distance between the attachment point and a left edge of the screen, and the vertical distance between the attachment point and a right edge of the screen. Similarly, the attachment point is provided to the window in a downward direction along the screen refers that the vertical distance between the attachment point and the lower edge of the screen is less than each of the vertical distance between the attachment point and the upper edge of the screen, the vertical distance between the attachment point and the left edge of the screen, and the vertical distance between the attachment point and the right edge of the screen. The attachment point is provided to the window in a left direction along the screen refers that the vertical distance between the attachment point and the left edge of the screen is less than each of the vertical distance between the attachment point and the upper edge of the screen, the vertical distance between the attachment point and the downward edge of the screen, and the vertical distance between the attachment point and the right edge of the screen. The attachment point is provided to the window in a right direction along the screen refers that the vertical distance between the attachment point and the right edge of the screen is less than each of the vertical distance between the attachment point and the upper edge of the screen, the vertical distance between the attachment point and the lower edge of the screen, and the vertical distance between the attachment point and the left edge of the screen.

Figure 4:
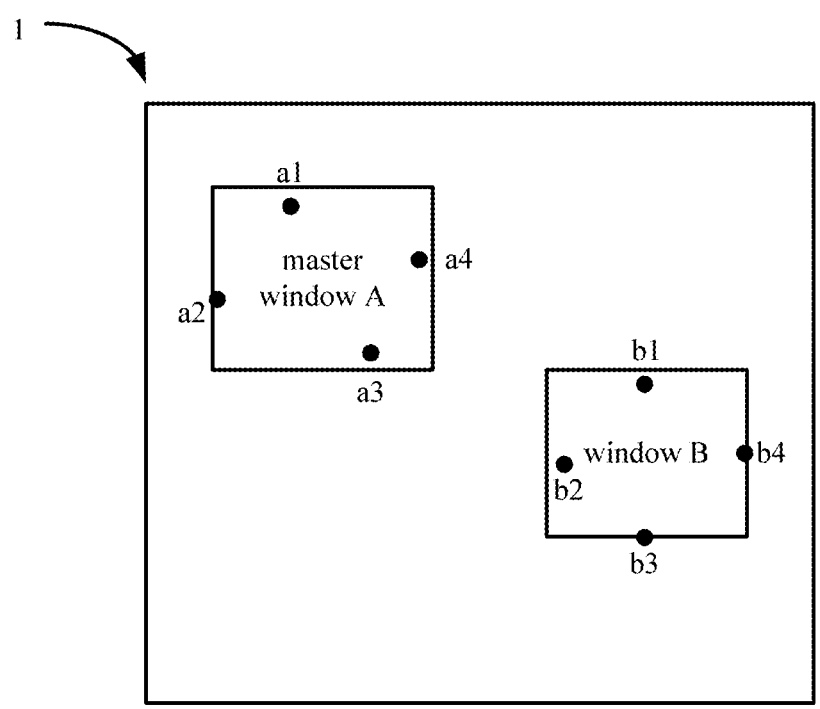
FIG. 4 is a schematic diagram showing a master window and a secondary window of an application according to an embodiment of the present disclosure.

The attachment point may refer to a pixel point which has an attachment function to enable windows to be merged, and may be any one of pixel points located in the window. Reference is made to FIG. 4, which is schematic diagram of a master window and a secondary window of an application according to an embodiment of the present disclosure. As shown in FIG. 4, the master window A is provided with an attachment point in each direction along the terminal screen, including an attachment point a1 provided in an upward direction along the terminal screen, an attachment point a2 provided in a left direction along the terminal screen, an attachment point a3 provided in a downward direction along the terminal screen, and an attachment point a4 provided in a right direction along the terminal screen. The secondary window B is provided with an attachment point b1 in an upward direction along the terminal screen, an attachment point b2 in a left direction along the terminal screen, an attachment point b3 in a downward direction along the terminal screen, and an attachment point b4 in a right direction along the terminal screen.

In step S102, a position of the master window on the screen is determined, in response to monitoring that the second window moves on the screen.

In step S103, a master attachment point of the master window and a slave attachment point of the secondary window are determined, from the at least one attachment point provided to the first window and the second window, according to the position of the master window on the screen.

The process of attaching and merging the master window and the secondary window may be triggered when it is monitored that the secondary window moves on the terminal screen. In this step, the position of the master window A on the terminal screen may be obtained from, for example, a storage of the terminal, and the position of the master window A refers to a coordinate range formed by coordinates of all pixel points in the master window A on the terminal screen. Based on the obtained position of the master window, a master attachment point is determined in the master window A, and a slave attachment point is determined in the secondary window B.

In step S104, the secondary window is attached to the master window by merging the slave attachment point into the master attachment point, to form a merged window.

Both the master attachment point and the slave attachment point have the attachment function, and by mutual attachment between the master attachment point and the slave attachment point, the master window A and the secondary window B may be merged to form the merged window. In an implementation, whether the master attachment point and the slave attachment point meet an attachment condition is determined. For example, whether a distance between the master attachment point and the slave attachment point is less than a threshold is determined, and the attachment condition is met if it is determined that the distance is less than the threshold. In response to determining that the master attachment point and the slave attachment point meet the attachment condition, the position of the master attachment point and the position of the slave attachment point are coincided, the master attachment point and the slave attachment point are attached to each other, and thus the master window A and the secondary window B are merged into one merged window.

In step S105, the merged window is displayed on the screen.

The merged window is a window as a whole. After being attached and merged, the master window A and the secondary window B are not independent of each other, but form a whole. In this step, the merged window as a whole is displayed on the terminal screen, to enable two windows run by the application at the same time to be displayed on the terminal screen as a whole, thereby enriching display manners.

According to the embodiment of the present disclosure, a master window and a secondary window may be determined from more than one windows of an application running at the same time and being separately displayed. A master attachment point and a slave attachment point are determined respectively in the master window and the secondary window, when the secondary window moves on a terminal screen. The master window and the secondary window can be attached and merged via the master attachment point and the slave attachment point, so that more than one window run by an application at the same time can be displayed in a separate manner or in a merging manner, thereby enriching display control manners of applications and enhancing flexibility of display control.

Figure 5:
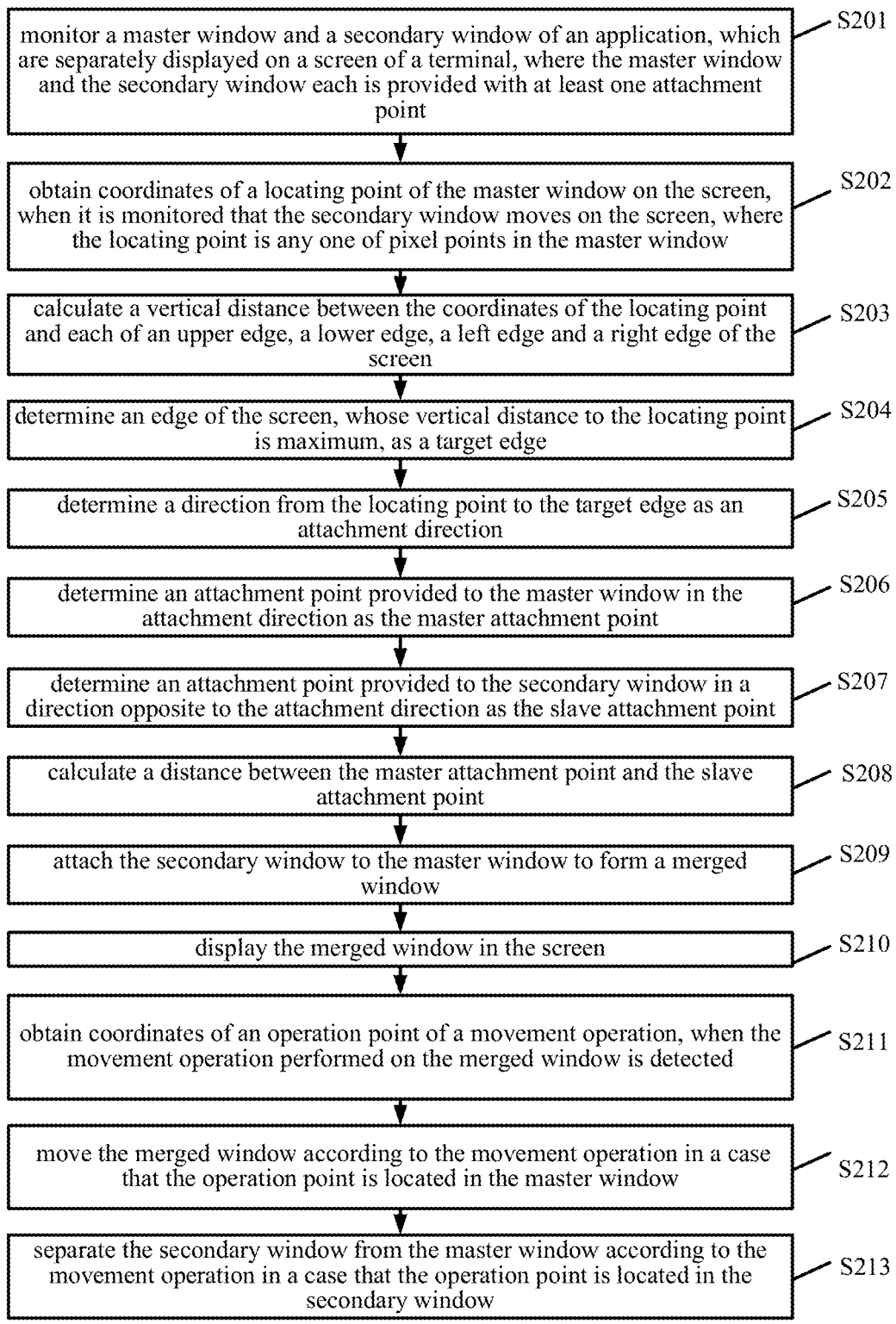
FIG. 5 is a flow chart of a display control method according to another embodiment of the present disclosure.

Reference is made to FIG. 5, which is a flow chart of a display control method according to another embodiment of the present disclosure. The method may include the following steps S201 to S213.

In step S201, a master window and a secondary window of an application, which are separately displayed on a screen of a terminal, are monitored. The master window and the secondary window each is provided with at least one attachment point.

Step S201 according to this embodiment may refer to step S101 in the embodiment shown in FIG. 1, which is not repeated herein.

In step S202, coordinates of a locating point of the master window on the screen is obtained, when it is monitored that the secondary window moves on the screen. The locating point is any one of pixel points in the master window.

Figure 6:
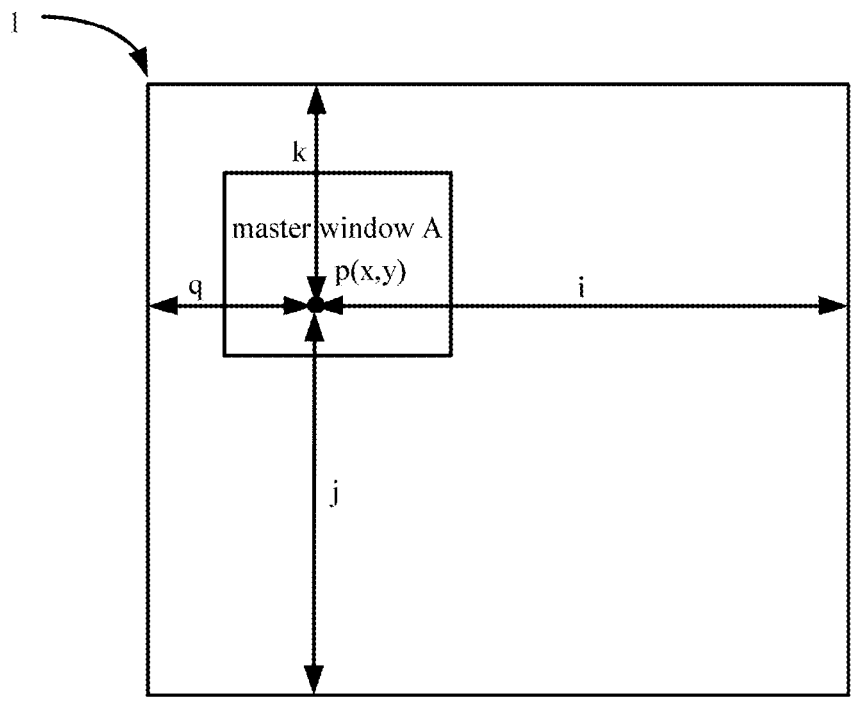
FIG. 6 is a schematic diagram of a locating point of a master window according to an embodiment of the present disclosure.

The process of attaching and merging the master window and the secondary window may be triggered when it is monitored that the secondary window moves on the terminal screen. A position of the master window A on the terminal screen is obtained from a storage of the terminal, and the position of the master window A refers to a range formed by coordinates of all pixel points in the master window A on the terminal screen. In this embodiment, any one of pixel points in the master window A may be selected as the locating point, and the coordinates of the locating point may be read from the obtained coordinate range of the master window A. For example, a central pixel point of the master window A may be selected as the locating point, and coordinates of the central pixel point is read from the coordinate range of the master window A as the coordinates of the locating point. Alternatively, a pixel point may be selected from an edge of the master window A as the locating point, and the coordinate of the locating point is read from the coordinate range of the master window A. Reference is made to FIG. 6, which is a schematic diagram of a locating point of a master window according to an embodiment of the present disclosure. As shown in FIG. 6, a locating point p is selected from the master window A, and coordinates of the locating point p is (x, y).

In step S203, a vertical distance between the coordinates of the locating point and each of an upper edge, a lower edge, a left edge and a right edge of the screen is calculated.

Referring to FIG. 6, in this step, the distance k between the locating point p(x, y) and the upper edge of the terminal screen, the distance j between the locating point p(x, y) and the lower edge of the terminal screen, the distance q between the locating point p(x, y) and the left edge of the terminal screen, and the distance i between the locating point p(x, y) and the right edge of the terminal screen are respectively calculated.

In step S204, an edge of the screen, whose vertical distance to the coordinates of the locating point is maximum, is determined as a target edge.

As shown in FIG. 6, in this step, values of k, j, q and i are compared. If the value of k is the maximum, the upper edge of the terminal screen is determined as the target edge. If the value of j is the maximum, the lower edge of the terminal screen is determined as the target edge. If the value of q is the maximum, the left edge of the terminal screen is determined as the target edge. If the value of i is the maximum, the right edge of the terminal screen is determined as the target edge.

In step S205, a direction from the locating point to the target edge is determined as an attachment direction.

It is assumed that the value of j is the maximum, that is, the lower edge of the terminal screen is determined as the target edge. The direction from the locating point p(x, y) to the lower edge of the terminal screen is the downward direction along the terminal screen, and the downward direction along the terminal screen is determined as the attachment direction in this step.

In step S206, an attachment point provided to the master window in the attachment direction is determined as the master attachment point.

The attachment point is provided to the master window A in directions along the terminal screen, that is, the attachment point a1 is set in an upward direction along the terminal screen, the attachment point a2 is set in a left direction along the terminal screen, attachment point a3 is set in a downward direction along the terminal screen, and attachment point a4 is set in a right direction along the terminal screen. Since the attachment direction is downward direction along the terminal screen, a3 may be determined as the master attachment point in this step.

In step S207, an attachment point provided to the secondary window in a direction opposite to the attachment direction is determined as the slave attachment point.

The attachment point is provided to the secondary window B in directions along the terminal screen, that is, the attachment point b1 is set in an upward direction along the terminal screen, the attachment point b2 is set in a left direction along the terminal screen, attachment point b3 is set in a downward direction along the terminal screen, and attachment point b4 is set in a right direction along the terminal screen. Since the direction opposite to the attachment direction is upward direction along the terminal screen, b1 may be determined as the slave attachment point in this step.

As stated above, in an implementation, the attachment point is provided to the window in an upward/downward/left/right direction along the screen refers that the vertical distance between the attachment point of the window and an upper/lower/left/right edge of the screen is less than each of the vertical distance between other attachment point of the window and the upper/lower/left/right edge of the screen. In this case, in determining the master and slave attachment points, steps 205-207 may be replaced by the following steps: determining vertical distances between each of the attachment points in the master window and the target edge and determining the attachment point, whose vertical distance to the target edge is smallest, as the master attachment point; determining vertical distances between each of the attachment points in the secondary window and the target edge, and determining the attachment point, whose vertical distance to the target edge is smallest, as the slave attachment point. Alternatively, steps 205-207 may be replaced by the following steps: determining vertical distances between each of the attachment points in the master window and the target edge and determining the attachment point, whose vertical distance to the target edge is smallest, as the master attachment point; determining an edge of the secondary window, which is opposite to the target edge of the master window, as a second target edge, and determining the attachment point of the secondary window, whose vertical distance to the second target edge is smallest, as the slave attachment point, where the edge of the secondary window which is opposite to the target edge of the master window means that, the edge of the secondary window which is opposite to the target edge of the master window is the lower edge if the target edge is the upper edge, the edge of the secondary window which is opposite to the target edge of the master window is the upper edge if the target edge is the lower edge, the edge of the secondary window which is opposite to the target edge of the master window is the left edge if the target edge is the right edge, and the edge of the secondary window which is opposite to the target edge of the master window is the right edge if the target edge is the left edge.

In step S208, a distance between the master attachment point and the slave attachment point is calculated.

In this step, coordinates of the master attachment point and the slave attachment point on the terminal screen may be respectively obtained from, for example, a storage of the terminal. In an example of this embodiment, in this step, coordinates of the master attachment point a3 and coordinates of the slave attachment point b1 on the terminal screen are obtained, and the distance between the master attachment point a3 and the slave attachment point b1 is calculated.

In step S209, the secondary window is attached to the master window to form a merged window, in a case that the distance between the master attachment point and the slave attachment point is less than a threshold.

Figure 7:
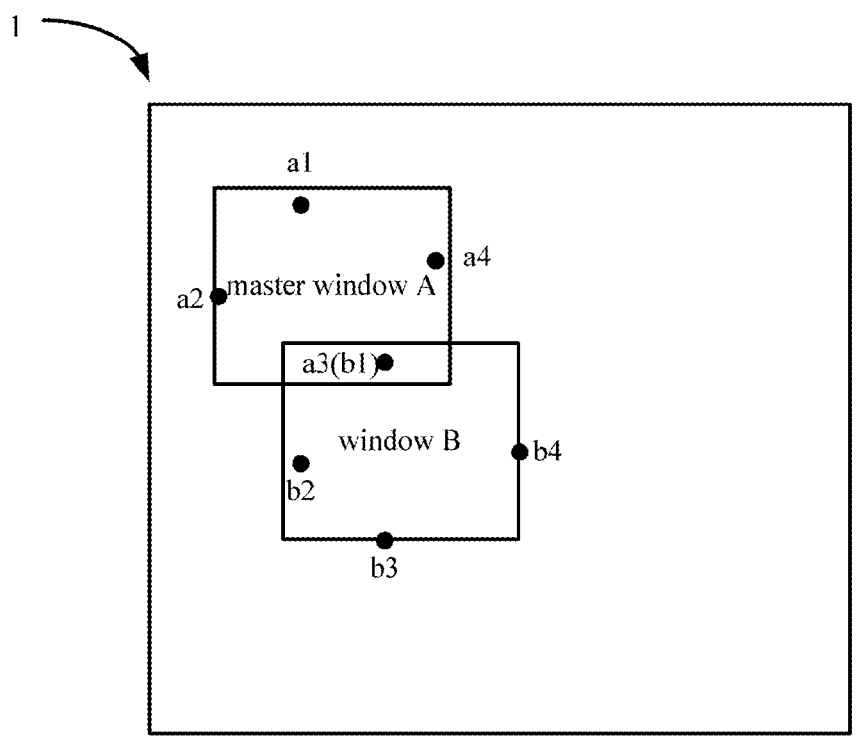
FIG. 7 is a schematic diagram of a merged window according to an embodiment of the present disclosure.

The threshold may be set according to practical demands In a case that the distance between the master attachment point a3 and the slave attachment point b1 is less than the threshold, it indicates that the master attachment point a3 and the slave attachment point b1 meet an attachment condition, the position of the master attachment point a3 and the position of the slave attachment point b1 are coincided, the master attachment point a3 and the slave attachment point b1 are merged to each other, and the master window A and the secondary window B are merged to form one merged window. Reference is made to FIG. 7, which is a schematic diagram of a merged window according to an embodiment of the present disclosure. As shown in FIG. 7, the merged window is formed after the master attachment point a3 and the slave attachment point b1 are merged.

It can be understood that, the secondary window B may be always moving. In this case, the distance between the master attachment point and the slave attachment point is calculated in step S208 in a real-time manner. In a case that the distance is less than the threshold, step 209 is performed to merging the master attachment point and the slave attachment point and attaching the secondary window and the master window to form the merged window.

In step S210, the merged window is displayed in the screen.

Step S210 in this embodiment may refer to step S104 in the embodiment shown in FIG. 1, which is not repeated herein.

In step S211, coordinates of an operation point of a movement operation is obtained, when the movement operation performed on the merged window is detected.

The coordinates of the operation point is coordinates of the operation point on the screen. In an implementation, the operation point may be any point on a trace of the movement operation.

In step S212, in a case that the operation point is located in the master window, the merged window is moved according to the movement operation.

In this step, it may be determined whether the coordinates of the operation point is within the coordinate range of the master window A. In a case that the coordinates of the operation point is within the coordinate range of the master window A, it indicates that the movement operation is performed on the master window A of the merged window, and the movement operation may be deemed as an movement operation performed on the whole merged window. Therefore, the merged window may be moved according to the movement operation to enable the merged window to move on the terminal screen as the movement operation is performed.

In step S213, in a case that the operation point is located in the secondary window, the master window and the secondary window are separated according to the movement operation.

In this step, it may be determined whether the coordinates of the operation point is within the coordinate range of the secondary window B. In a case that the coordinates of the operation point is within the coordinate range of the secondary window B, it indicates that the movement operation is performed on the secondary window B of the merged window, and the movement operation may be deemed as an movement operation to be performed to drag the secondary window B away from the master window A. Therefore, the master window A and the secondary window B may be separated according to the movement operation.

In an implementation, step S213 includes the following steps s11 to s13.

In step s11, in a case that the operation point is located in the secondary window, the attachment of the slave attachment point to the master attachment point is released, e.g., the slave attachment point is separated from the master attachment point.

In step s12, the distance between the slave attachment point and the master attachment point is calculated. The secondary window B is always moving during the movement operation is performed. Therefore, the distance between the slave attachment point b1 and the master attachment point a3 is calculated in step s12 in a real-time manner.

In step s13, in a case that the distance between the slave attachment point and the master attachment point is greater than a threshold, the master window and the secondary window are separately displayed on the terminal screen.

In a case that the distance between the slave attachment point b1 and the master attachment point a3 is greater than a threshold, it indicates that the attachment point a3 and the slave attachment point b1 do not meet the attachment condition but meet a separation condition, and the master window A and the secondary window B are separately displayed on the terminal screen.

According to the embodiment of the present disclosure, a master window and a secondary window may be determined from more than one windows running by the application at a same time and being separately displayed. It should be noted that there may be one or more secondary windows. A master attachment point and a slave attachment point are determined respectively in the master window and the secondary window, when the secondary window moves on the screen. The master window and the secondary window can be attached and merged via the master attachment point and the slave attachment point, so that windows of an application running at a same time can be displayed in a separate manner or in a merging manner, thereby enriching display control manners of the application and enhancing flexibility of display control.

A display control device according to an embodiment of the present disclosure is described in conjunction with FIG. 8 to FIG. 11. It should be noted that, the device described below may be an application with a display control capacity, for example, a security application, in the terminal, and is configured to execute the display control method shown in FIG. 1 to FIG. 6.

Figure 8:
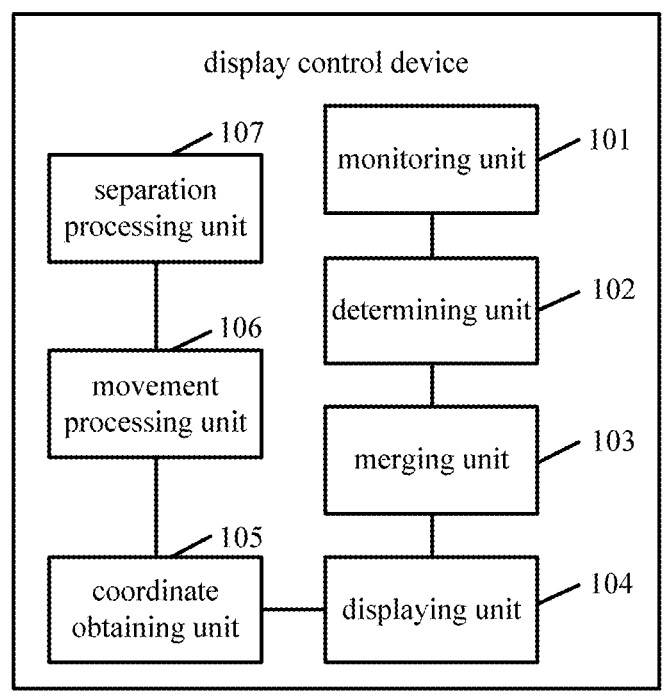
FIG. 8 is a schematic structural diagram of a display control device according to an embodiment of the present disclosure.

Reference is made to FIG. 8, which is a schematic structural diagram of a display control device according to an embodiment of the present disclosure. The device may include a monitoring unit 101, a determining unit 102, a merging unit 103 and a displaying unit 104.

The monitoring unit 101 is configured to monitor a master window and a secondary window of an application, which are separately displayed on a screen of a terminal. The master window and the secondary each is provided with at least one attachment point.

The application may be, for example, an instant messaging application, an SNS application, a game application, or a security application in a terminal. Two windows of the application may run at the same time. For example, if the application is an instant messaging application, two chat windows of the application can be running at the same time. For another example, if the application is a security application, an optimization acceleration function window and a Trojan killing function window of the application can be running at the same time. The master window and the secondary window of the application, which are separately displayed on the screen, are monitored. The display control method according to the embodiments of the present disclosure is not triggered, e.g., the process of attaching and merging of the windows is not triggered, when the master window moves on the screen. The display control method is triggered, e.g., the process of attaching and merging of the windows is triggered, when the secondary window moves on the screen. Therefore, the monitoring unit 101 may be mainly configured to monitor whether the secondary window moves on the screen. Specifically, whether there is a movement operation on the secondary window may be determined. If it is determined that there is the movement operation on the secondary window, it indicates that the secondary window moves on the screen, and the process of attaching and merging the master window and the secondary window is triggered.

If two windows of the application are running at the same time, one of the windows is set as the master window, the other of the windows is set as the secondary window, and the master window and the secondary window are independent of each other and are separately displayed on the screen. As shown in FIG. 2, window A and window B are two windows of an application. The window A may be set as the master window and the window B may be set as the secondary window, and the window A and the window B are separately displayed on a screen 1 of a terminal. When being displayed on the screen, the master window A occupies a position on the screen, and the position of the master window A refers to a coordinate range formed by coordinates of all pixel points in the master window A on the terminal screen. When being displayed on the screen, the secondary window B occupies a position on the screen, and the position of the secondary window B refers to a coordinate range formed by coordinates of all pixel points in the secondary window B on the screen. In an embodiment of the present disclosure, the terminal stores the position of each window displayed on the screen, and each window displayed on the screen may move on the screen when being dragged by a user, which changes the position. When the position of each window is changed, the terminal will timely update the stored position of each window.

In an implementation, the at least one attachment point is provided to the first window or the second window in at least one direction along the screen.

The direction along the screen may include an upward direction along the screen, a downward direction along the screen, a left direction along the screen, or a right direction along the screen. The attachment point may refer to a pixel point which has an attachment function to enable windows to be merged, and may be any one of pixel points located in a region of the window. As shown in FIG. 4, the master window A is provided with an attachment point in each direction along the screen, including an attachment point a1 provided in an upward direction along the screen, an attachment point a2 provided in a left direction along the screen, an attachment point a3 provided in a downward direction along the screen, and an attachment point a4 provided in a right direction along the screen. The secondary window B is provided with an attachment point b1 in an upward direction along the screen, an attachment point b2 in a left direction along the screen, an attachment point b3 in a downward direction along the screen, and an attachment point b4 in a right direction along the screen.

The determining unit 102 is configured to determine a master attachment point of the master window and a slave attachment point of the secondary window, according to a position of the master window on the screen, when it is monitored that the secondary window moves on the screen.

The process of attaching and merging the master window and the secondary window may be triggered, when it is monitored that the secondary window moves on the terminal screen. The determining unit 102 may be configured to obtain the position of the master window A on the screen from, for example, a storage of the terminal, and the position of the master window A refers to a coordinate range formed by coordinates of all pixel points in the master window A on the terminal screen. Based on the obtained position of the master window, a master attachment point is determined in the master window A, and a slave attachment point is determined in the secondary window B.

The merging unit 103 is configured to attach the secondary window to the master window by merging the slave attachment point into the master attachment point, to form a merged window.

Both the master attachment point and the slave attachment point have the attachment function, and by mutual attachment between the master attachment point and the slave attachment point, the master window A and the secondary window B are merged to form the merged window. In an implementation, whether the master attachment point and the slave attachment point meet an attachment condition is determined. For example, whether a distance between the master attachment point and the slave attachment point is less than a threshold may be determined, and the attachment condition is met if it is determined that the distance is less than the threshold. In response to determining that the master attachment point and the slave attachment point meet the attachment condition, the position of the master attachment point and the position of the slave attachment point are coincided, the master attachment point and the slave attachment point are attached to each other, and the master window A and the secondary window B are merged to form a merged window.

The displaying unit 104 is configured to display the merged window on the screen.

The merged window is a window as a whole. After being attached and merged, the master window A and the secondary window B are not independent of each other, but form a whole. The displaying unit 104 is configured to display the merged window as a whole on the screen, to enable two windows of the application running at the same time to be displayed on the screen as a whole, thereby enriching display manners.

Reference is made to FIG. 8. In an implementation, the device may further include a coordinate obtaining unit 105, a movement processing unit 106 and a separation processing unit 107.

The coordinate obtaining unit 105 is configured to obtain coordinates of an operation point of a movement operation, when the movement operation performed on the merged window is detected. The coordinates of the operation point is coordinates of the operation point on the screen.

The movement processing unit 106 is configured to move the merged window according to the movement operation, in a case that the operation point is located in the master window.

The movement processing unit 106 may determine whether the coordinates of the operation point is within the coordinate range of the master window A. In a case that the coordinates of the operation point is within the coordinate range of the master window A, it indicates that the movement operation is performed on the master window A of the merged window, and the movement operation may be deemed as an movement operation performed on the whole merged window. Therefore, the merged window may be moved according to the movement operation to enable the merged window to move on the terminal screen as the movement operation is performed.

The separation processing unit 107 is configured to separate the secondary window from the master window according to the movement operation, in a case that the operation point is located in the secondary window.

The separation processing unit 107 may be configured to determine whether the coordinates of the operation point is within the coordinate range of the secondary window B. In a case that the coordinates of the operation point is within the coordinate range of the secondary window B, it indicates that the movement operation is performed on the secondary window B in the merged window, and the movement operation may be deemed as an movement operation to be performed to drag the secondary window B away from the master window A. Therefore, the master window A and the secondary window B may be separated according to the movement operation.

According to the embodiment of the present disclosure, a master window and a secondary window may be determined from in more than one window of an application running at the same time and being separately displayed. A master attachment point and a slave attachment point are determined respectively in the master window and the secondary window, when the secondary window moves on a screen. The master window and the secondary window can be attached and merged via the master attachment point and the slave attachment point, so that windows of the application running at the same time can be displayed in a separate manner or in a merging manner, thereby enriching display control manners of an application and enhancing flexibility of display control.

Figure 9:
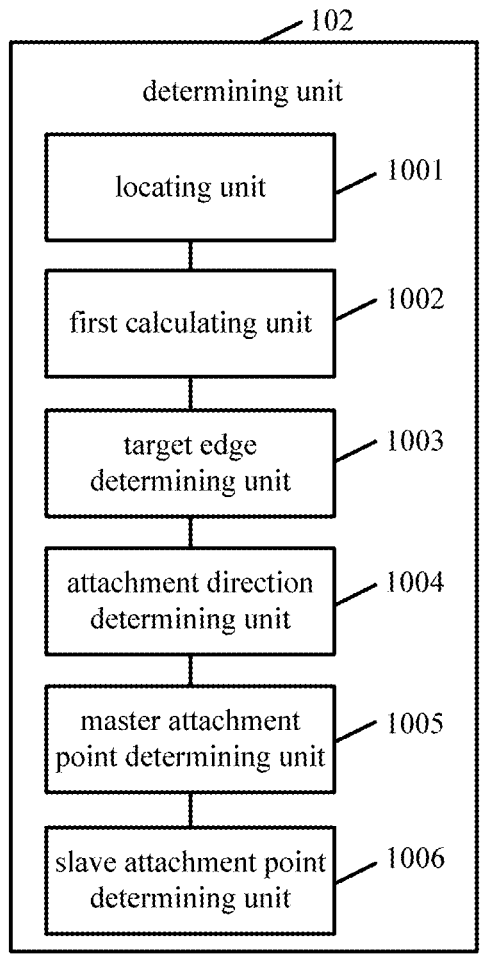
FIG. 9 is a schematic structural diagram of a determining unit according to the embodiment shown in FIG. 8.

Reference is made to FIG. 9, which is a schematic structural diagram of a determining unit according to the embodiment shown in FIG. 8. The determining unit 102 may include a locating unit 1001, a first calculating unit 1002, a target edge determining unit 1003, an attachment direction determining unit 1004, a master attachment point determining unit 1005 and a slave attachment point determining unit 1006.

The locating unit 1001 is configured to obtain coordinates of a locating point of the master window on the screen, when it is monitored that the secondary window moves on the screen. The locating point is any one of pixel points in the master window.

The process of attaching and merging the master window and the secondary window may be triggered, when it is monitored that the secondary window moves on the screen. A position of the master window A on the screen is obtained from, for example, a storage of the terminal, and the position of the master window A refers to a coordinate range formed by coordinates of all pixel points in the master window A on the screen. In this embodiment, any one of pixel points may be selected from the master window A as the locating point, and the coordinates of the locating point may be read from the obtained coordinate range of the master window A. For example, a central pixel point of the master window A may be selected as the locating point, and coordinates of the central pixel point is read from the coordinate range of the master window A as the locating coordinates. Alternatively, an edge pixel point may be selected from an edge of the master window A as the locating point, and the coordinates of the locating point is read from the coordinate range of the master window A. As shown in FIG. 6, a locating point p is selected from the master window A, and coordinates of the locating point p is (x, y).

The first calculating unit 1002 is configured to calculate a distance between the coordinates of the locating point and each of an upper edge, a lower edge, a left edge and a right edge of the screen.

Referring to FIG. 6, the first calculating unit 1002 is configured to respectively calculate the vertical distance k between the locating point p(x, y) and the upper edge of the terminal screen, the vertical distance j between the locating point p(x, y) and the lower edge of the terminal screen, the vertical distance q between the locating point p(x, y) and the left edge of the terminal screen, and the vertical distance i between the locating point p(x, y) and the right edge of the terminal screen.

The target edge determining unit 1003 is configured to determine an edge of the terminal screen, whose vertical distance to the locating point is maximum, as a target edge.

As shown in FIG. 6, the target edge determining unit 1003 is configured to compare values of k, j, q and i. If the value of k is the maximum, the upper edge of the terminal screen is determined as the target edge. If the value of j is the maximum, the lower edge of the terminal screen is determined as the target edge. If the value of q is the maximum, the left edge of the terminal screen is determined as the target edge. If the value of i is the maximum, the right edge of the terminal screen is determined as the target edge.

The attachment direction determining unit 1004 is configured to determine a direction from the locating point to the target edge as an attachment direction.

It is assumed that the value of j is the maximum, that is, the lower edge of the terminal screen is determined as the target edge. The direction from the locating point p(x, y) pointing to the lower edge of the terminal screen is the direction downwards along the terminal screen, and the attachment direction determining unit 1004 may be configured to determine a downward direction along the terminal screen as the attachment direction.

The master attachment point determining unit 1005 is configured to determine the attachment point provided to the master window in the attachment direction as the master attachment point.

The attachment point is provided to the master window A in each direction along the terminal screen. For example, the attachment point a1 is provided in an upward direction along the terminal screen, the attachment point a2 is provided in a left direction along the terminal screen, attachment point a3 provided in a right direction along the terminal screen, and attachment point a4 is provided in a downward direction along the terminal screen. Since the attachment direction is the downward direction along the terminal screen, the master attachment point determining unit 1005 may be configured to determine a3 as the master attachment point.

The slave attachment point determining unit 1006 is configured to determine an attachment point provided to the secondary window in a direction opposite to the attachment direction as the slave attachment point.

The attachment point is provided to the secondary window B in each direction along the terminal screen. For example, the attachment point b1 is provided in an upward direction along the terminal screen, the attachment point b2 is provided in a left direction along the terminal screen, attachment point b3 is provided in a downward direction along the terminal screen, and attachment point b4 is provided in a right direction along the terminal screen. Since the direction opposite to the attachment direction is the upward direction along the terminal screen, the slave attachment point determining unit 1006 may be configured to determine b1 as the slave attachment point.

According to the embodiment of the present disclosure, a master window and a secondary window may be determined from more than one windows of an application running at the same time and being separately displayed. A master attachment point and a slave attachment point are determined respectively in the master window and the secondary window, when the secondary window moves on a screen. The master window and the secondary window can be attached and merged via the master attachment point and the slave attachment point, windows of the application running at the same time can be displayed in a separate manner or in a merging manner, thereby enriching display control manners of an application and enhancing flexibility of display control.

Figure 10:
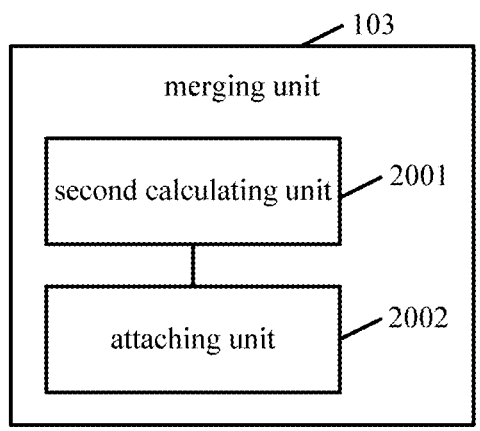
FIG. 10 is a schematic structural diagram of a merging unit according to the embodiment shown in FIG. 8.

Reference is made to FIG. 10, which is a schematic structural diagram of a merging unit according to the embodiment shown in FIG. 8. The merging unit 103 may include a second calculating unit 2001 and an attachment unit 2002.

The second calculating unit 2001 is configured to calculate a distance between the master attachment point and the slave attachment point.

The second calculating unit 2001 may configured to obtain coordinates of the master attachment point and the slave attachment point on the screen from, for example, a storage of the terminal. In an example of this embodiment shown in FIG. 8, the second calculating unit 2001 is configured to obtain coordinates of the master attachment point a3 and coordinates of the slave attachment point b1 on the terminal screen, and calculate the distance between the master attachment point a3 and the slave attachment point b1.

The attachment unit 2002 is configured to attach the secondary window to the master window to form a merged window, in response to determining that the distance between the master attachment point and the slave attachment point is less than a threshold.

The threshold may be set according to practical demands In a case that a distance between the master attachment point a3 and the slave attachment point b1 is less than the threshold, it indicates that the master attachment point a3 and the slave attachment point b1 meet an attachment condition, and the attachment unit 2002 may cause a position of the master attachment point a3 and a position of the slave attachment point b1 to be coincided to enable the master attachment point a3 and the slave attachment point b1 to be attached to each other, and further to enable the master window A and the secondary window B to be merged to form a merged window. As shown in FIG. 7, the merged window is formed if the master attachment point a3 and the slave attachment point b1 are attached.

It can be understood that, the secondary window B may be always moving, and in this case, the second calculating unit 2001 is configured to calculate the distance between the master attachment point and the slave attachment point in a real-time manner. In a case that the distance is less than a threshold, the attachment unit 2002 is configured to attach the master attachment point to the slave attachment point, to enable the secondary window to be attached to the master window to form the merged window.

According to the embodiment of the present disclosure, a master window and a secondary window may be determined from more than one windows of an application running at the same time and being separately displayed. A master attachment point and a slave attachment point are determined respectively in the master window and the secondary window, when the secondary window moves on a screen. The master window and the secondary window can be attached and merged via the master attachment point and the slave attachment point, the windows of the application running at the same time can be displayed in a separate manner or in a merging manner, thereby enriching display control manners of an application and enhancing flexibility of display control.

Figure 11:
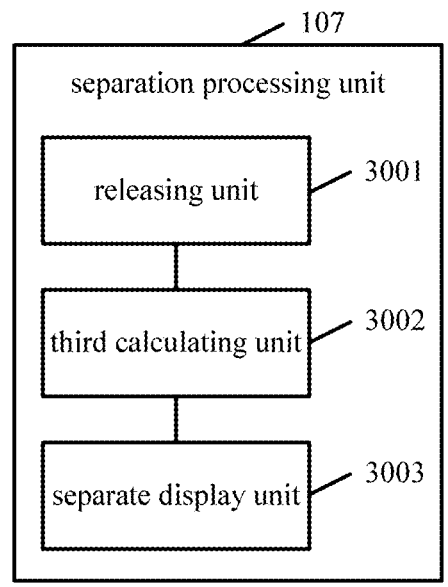
FIG. 11 is a schematic structural diagram of a separation processing unit according to the embodiment shown in FIG. 8.

Reference is made to FIG. 11, which is a schematic structural diagram of a separation processing unit according to the embodiment shown in FIG. 8. The separation processing unit 107 may include a releasing unit 3001, a third calculating unit 3002 and a separate display unit 3003.

The releasing unit 3001 is configured to release the attachment of the slave attachment point to the master attachment point, in a case that the operation point is located in the secondary window.

The third calculating unit 3002 is configured to calculate the distance between the slave attachment point and the master attachment point. The secondary window B is always moving during the movement operation is performed. Therefore, the third calculating unit 3002 is configured to calculate the distance between the slave attachment point b1 and the master attachment point a3 in a real-time manner.

The separate display unit 3003 is configured to separately display the master window and the secondary window on the screen, in a case that the distance between the slave attachment point and the master attachment point is greater than a threshold.

In a case that the distance between the slave attachment point b1 and the master attachment point a3 is greater than a threshold, it indicates that the attachment point a3 and the slave attachment point b1 do not meet the attachment condition but meet a separation condition, and the master window A and the secondary window B are separately displayed on the terminal screen.

According to the embodiment of the present disclosure, a master window and a secondary window may be determined from more than one windows of an application running at the same time and being separately displayed. A master attachment point and a slave attachment point are determined respectively in the master window and the secondary window, when the secondary window moves on a screen. The master window and the secondary window can be attached and merged via the master attachment point and the slave attachment point, the windows of the application running at the same time can be displayed in a separate manner or in a merging manner, thereby enriching display control manners of an application and enhancing flexibility of display control.

A terminal is further provided according to an embodiment of the present disclosure. The terminal may include a display control device. The structure and functions of the device may refer to the related descriptions of the embodiments shown in FIG. 8 to FIG. 11, which are not repeated herein. In an implementation, the device may be an application with the display control capacity, for example, a security application, in the terminal. It should be noted that, the terminal according to the embodiment of the present disclosure may also perform the method shown in FIG. 1 to FIG. 7.

According to the embodiment of the present disclosure, a master window and a secondary window may be determined from more than one windows of an application running at the same time and being separately displayed. A master attachment point and a slave attachment point are determined respectively in the master window and the secondary window, when the secondary window moves on a terminal screen. The master window and the secondary window can be attached and merged via the master attachment point and the slave attachment point, the windows of the application running at the same time can be displayed in a separate manner or in a merging manner, thereby enriching display control manners of an application and enhancing flexibility of display control.

Figure 12:
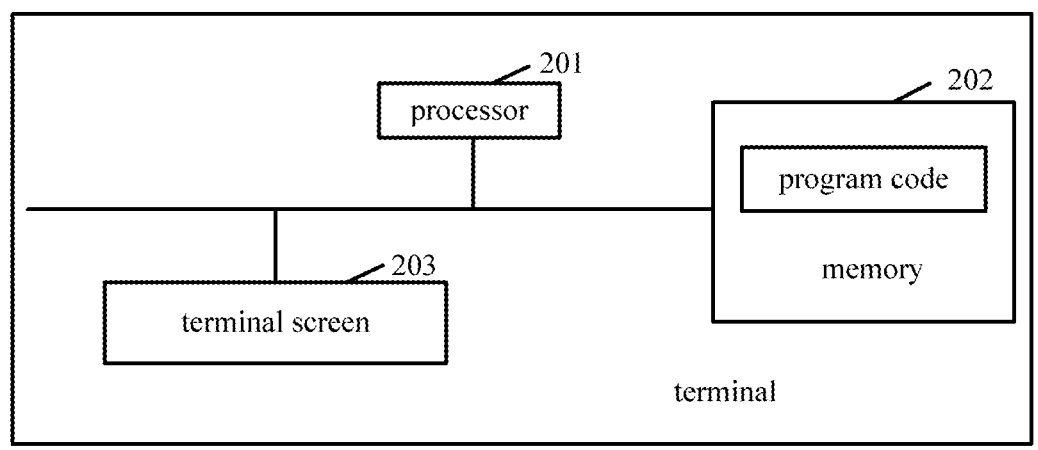
FIG. 12 is schematic structural diagram of a terminal according to an embodiment of the present disclosure.

Reference is made to FIG. 12. A terminal is further provided according to an embodiment of the present disclosure, which may include a processor 201, a memory 202, and a terminal screen 203, with those components communicating with each other via one or more buses. It can be understood by those skilled in the art that, the structure of the terminal shown in FIG. 12 is not constructed as limiting the present disclosure, which may has a bus structure, or a star structure, and may also include more or less components than those illustrated in FIG. 12, or have any combination of some components, or have a different arrangement of components.

The processor 201 is a control center of the terminal, and is connected to various parts of the whole terminal via various interfaces and wires. The processor 201 executes various functions of the terminal and/or processes data by running or executing program codes and/or modules stored in the memory 202, and calling data stored in the memory 202.

The memory 202 may be configured to store program codes and/or modules. The processor 201 executes various functions of the terminal and processes data by running the program codes and the modules stored in the memory 202. The memory 202 mainly includes a program storage region and a data storage region. The program storage region may store an operating system and code required by at least one program function, for example, program codes for service processing, and the data storage region may store data created due to use of the terminal.

In the terminal shown in FIG. 12, the processor 102 may execute the program codes stored in the memory 202 to:

monitor a master window and a secondary window of an application, which are separately displayed on a screen 203 of the terminal, where the master window and the secondary window each is provided with at least one attachment point;

determine a position of the master window on the screen 203, when it is monitored that the secondary window moves on the screen 203;

determine a master attachment point of the master window and a slave attachment point of the secondary window, from the at least one attachment point provided to the first window and the second window, according to the position of the first window on the screen;

attach the secondary window to the master window by merging the slave attachment point into the master attachment point, to form a merged window; and display the merged window on the screen 203.

In an implementation, the at least one attachment point is provided to the first window or the second window in at least one of an upward direction along the screen, a downward direction along the screen, a left direction along the screen and a right direction along the screen.

In an implementation, the processor 201 determines the position of the master window on the screen 203 by obtaining coordinates of a locating point of the master window on the screen 203, when it is monitored that the secondary window moves on the screen 203. The locating point is any one of pixel points in the master window.

In an implementation, the processor 201 determines the master attachment point in the master window and the slave attachment point in the secondary window by calculating a distance between the coordinates of the locating point and each of edges of the screen 203, the edges of the terminal screen 203 including an upper edge, a lower edge, a left edge and a right edge, determining an edge of the terminal screen 203 corresponding to the maximum distance as a target edge, determining a direction from the locating point to the target edge as an attachment direction, determining an attachment point provided to the master window in the attachment direction as a master attachment point, and determining an attachment point provided to the secondary window in a direction opposite to the attachment direction as a slave attachment point.

In an implementation, the processor 201 attaches the secondary window to the master window by calculating a distance between the master attachment point and the slave attachment point, and attaches the secondary window to the master window to form a merged window in a case that the distance between the master attachment point and the slave attachment point is less than a threshold.

In an implementation, after the processor 201 is configured to execute the program codes to display the merged window on the screen 203, the processor 201 is further configured to execute the program codes to obtain coordinates of an operation point of a movement operation, when the movement operation performed on the merged window is detected, move the merged window according to the movement operation in a case that the operation point is located in the master window, and separate the secondary window from the master window according to the movement operation in a case that the operation point is located in the secondary window.

In an implementation, the processor 201 separates the secondary window from the master window by releasing the attachment of the slave attachment point to the master attachment point in a case that the operation point is located in the secondary window, calculating the distance between the slave attachment point and the master attachment point, and displaying the master window and the secondary window separately on the screen 203 in response to determining that the distance between the slave attachment point and the master attachment point is greater than a threshold.

A computer readable storage medium is further provided according to an embodiment of the present disclosure. The computer readable storage medium is a non-transitory storage medium. The computer readable storage medium is for storing computer readable program codes that are executed in a terminal to perform the above display control method shown in FIGS. 1-7.

It can be understood by those skilled in the art that, all or part of steps implementing the methods in the above-described embodiments may be completed by hardware instructed by relevant program instructions, which may be stored in a computer readable storage medium and include the steps implementing the methods in the above-described embodiments, when executed. The storage medium may be a magnetic disk, an optical disc, a read-only memory (ROM) and a random access memory (RAM).

The above are only preferred embodiments of the present disclosure, but the protection scope of the present disclosure is not limited to these embodiments. Therefore, various equivalents according to the claims of the present disclosure are fall within the protection scope of the present disclosure.

The invention claimed is:

1. A display control method, comprising:
    monitoring, by a processor, a first window and a second window of an application, which are separately displayed on a screen of a terminal, wherein the first window and the second window each is provided with at least one attachment point;
    determining, by the processor, a position of the first window on the screen, in response to monitoring that the second window moves on the screen;
    determining, by the processor, a master attachment point of the first window and a slave attachment point of the second window, from the at least one attachment point provided to the first window and the second window, according to the position of the first window on the screen;
    attaching, by the processor, the second window to the first window by merging the slave attachment point into the master attachment point, to form a merged window; and
    displaying, by the processor, the merged window on the screen,
    wherein determining, by the processor, the position of the first window on the screen comprises:
        obtaining coordinates of a locating point of the first window on the screen,
    wherein the locating point is any one of the pixel points in the first window, and
    wherein determining the master attachment point of the first window and the slave attachment point of the second window comprises:
        calculating a vertical distance between the coordinates of the locating point and each of an upper edge, a lower edge, a left edge and a right edge of the screen;
        determining an edge of the screen, whose vertical distance to the coordinates of the locating point is the maximum, as a target edge;
        determining a direction from the locating point to the target edge as an attachment direction;
        determining an attachment point provided to the first window in the attachment direction as the master attachment point; and
        determining an attachment point provided to the second window in a direction opposite to the attachment direction as the slave attachment point.

2. The method according to claim 1, wherein attaching the second window to the first window by merging the slave attachment point into the master attachment point, to form the merged window comprises:
    calculating a distance between the master attachment point and the slave attachment point; and
    attaching the second window to the first window to form the merged window, in response to determining that the distance between the master attachment point and the slave attachment point is less than a threshold.

3. The method according to the claim 2, wherein after displaying the merged window on the screen, the method further comprises:
    obtaining coordinates of an operation point of a movement operation, when the movement operation performed on the merged window is detected;
    moving the merged window according to the movement operation, in a case that the operation point is located in the first window; and
    separating the second window from the first window according to the movement operation, in a case that the operation point is located in the second window.

4. The method according to the claim 3, wherein separating the second window from the first window according to the movement operation comprises:
    separating the slave attachment point from the master attachment point;
    calculating the distance between the slave attachment point and the master attachment point; and
    displaying the first window and the second window separately on the screen, in response to determining that the distance between the slave attachment point and the master attachment point is greater than a threshold.

5. A terminal, comprising:
a screen;
a memory having program codes stored therein; and
a processor that is configured to executes the program codes to:
  monitor a first window and a second window of an application, which are separately displayed on the screen, wherein the first window and the second window each is provided with at least one attachment point;
  determine a position of the first window on the screen, when it is monitored that the second window moves on the screen;
  determine a master attachment point of the first window and a slave attachment point of the second window, from the at least one attachment point provided to the first window and the second window, according to the position of the first window on the screen;
  attach the second window to the first window by merging the slave attachment point into the master attachment point, to form a merged window; and
  display the merged window on the screen,
  wherein the processor, in determining the position of the first window on the screen, is configured to:
    obtain coordinates of a locating point of the first window on the screen,
  wherein the locating point is any one of the pixel points in the first window, and
  wherein the processor, in determining the master attachment point of the first window and determining the slave attachment point of the second window, is configured to:
    calculate a vertical distance between the coordinates of the locating point and each of an upper edge, a lower edge, a left edge and a right edge of the screen;
    determine an edge of the screen, whose vertical distance to the coordinates of the locating point is the maximum, as a target edge;
    determine a direction from the locating point to the target edge as an attachment direction;
    determine an attachment point provided to the first window in the attachment direction as the master attachment point; and
    determine an attachment point provided to the second window in a direction opposite to the attachment direction as the slave attachment point.

6. The terminal according to claim 5, wherein the processor, in attaching the second window to the first window by merging the slave attachment point into the master attachment point, is configured to:
  calculate a distance between the master attachment point and the slave attachment point; and
  attach the second window to the first window to form the merged window, in response to determining that the distance between the master attachment point and the slave attachment point is less than a threshold.

7. The terminal according to claim 6, wherein after the merged window is displayed on the screen, the processor is further configured to:
  obtain coordinates of an operation point of a movement operation, when the movement operation performed on the merged window is detected;
  move the merged window according to the movement operation, in a case that the operation point is located in the first window; and
  separate the second window from the first window according to the movement operation, in a case that the operation point is located in the second window.

8. The terminal according to claim 7, wherein the processor, in separating the second window from the first window, is configured to:
  separate the slave attachment point from the master attachment point;
  calculate the distance between the slave attachment point and the master attachment point; and
  display the first window and the second window separately on the screen, in response to determining that the distance between the slave attachment point and the master attachment point is greater than a threshold.

9. A computer readable storage medium for storing computer readable program codes that are executed in a terminal to:
  monitor a first window and a second window of an application, which are separately displayed on a screen of the terminal, wherein the first window and the second window each is provided with at least one attachment point;
  determine a position of the first window on the screen, when it is monitored that the second window moves on the screen;
  determine a master attachment point of the first window and a slave attachment point of the second window, from the at least one attachment point provided to the first window and the second window, according to the position of the first window on the screen;
  attach the second window to the first window by merging the slave attachment point into the master attachment point, to form a merged window; and
  display the merged window on the screen,
  wherein determining the position of the first window on the screen comprises:
    obtaining coordinates of a locating point of the first window on the screen,
  wherein the locating point is any one of the pixel points in the first window, and
  wherein determining the master attachment point of the first window and the slave attachment point of the second window comprises:
    calculating a vertical distance between the coordinates of the locating point and each of an upper edge, a lower edge, a left edge and a right edge of the screen;
    determining an edge of the screen, whose vertical distance to the coordinates of the locating point is the maximum distance, as a target edge;
    determining a direction from the locating point to the target edge as an attachment direction;
    determining an attachment point provided to the first window in the attachment direction as the master attachment point; and
    determining an attachment point provided to the second window in a direction opposite to the attachment direction as the slave attachment point.

10. The computer readable storage medium according to claim 9, wherein attaching the second window to the first window by merging the slave attachment point into the master attachment point to form the merged window comprises:
  calculating a distance between the master attachment point and the slave attachment point; and
  attaching the second window to the first window to form the merged window, in response to determining that the distance between the master attachment point and the slave attachment point is less than a threshold.

11. The computer readable storage medium according to claim 10, wherein after displaying the merged window on the screen, the computer readable program codes is further executed in the terminal to:
   obtain coordinates of an operation point of a movement operation, when the movement operation performed on the merged window is detected;
   move the merged window according to the movement operation, in a case that the operation point is located in the first window; and
   separate the second window from the first window according to the movement operation, in a case that the operation point is located in the second window.

12. The computer readable storage medium according to claim 11, wherein separating the second window from the first window according to the movement operation comprises:
   separating the slave attachment point from the master attachment point;
   calculating the distance between the slave attachment point and the master attachment point; and
   displaying the first window and the second window separately on the screen, in response to determining that the distance between the slave attachment point and the master attachment point is greater than a threshold.

* * * * *